United States Patent [19]

Thornton et al.

[11] Patent Number: 5,278,709
[45] Date of Patent: Jan. 11, 1994

[54] ASSEMBLY OF COMPACT DISK DRIVE HAVING A GLASS DISK WITH A MAGNESIUM HEAD ARM ASSEMBLY AND A STEEL MOTOR HUB

[75] Inventors: Arnold O. Thornton, San Jose; Akihiko Kumano, Cupertino; Thien-Greg N. Nguyen, San Jose; Robert F. Hoppe, Campbell; Donald P. Williams, San Jose, all of Calif.

[73] Assignee: Areal Technology, San Jose, Calif.

[21] Appl. No.: 776,186

[22] Filed: Oct. 15, 1991

[51] Int. Cl.⁵ .................................. G11B 5/012
[52] U.S. Cl. ......................... 360/97.01; 360/97.02
[58] Field of Search ............ 360/97.02, 99.08, 99.12, 360/106, 135, 97.01, 104, 107, 109

[56] References Cited

U.S. PATENT DOCUMENTS

| | | | |
|---|---|---|---|
| 4,034,411 | 7/1977 | Kraemer et al. | 360/98 |
| 4,985,792 | 1/1991 | Moir | 360/99.08 |
| 5,029,027 | 7/1991 | Sleger | 360/97.3 |

Primary Examiner—David C. Nelms
Assistant Examiner—T. Davenport
Attorney, Agent, or Firm—Nathan N. Kallman

[57] ABSTRACT

A compact disk drive useful with a laptop computer comprises at least one glass disk, thin film read/write heads and a head actuator preferably made of magnesium material. The drive motor hub and hub flange are made of steel and the magnet housing for the actuator is made from an integral steel unit. A flexible cable assembly, which is connected to the read/write head circuits and to external circuitry for data processing and for providing control signals, is formed with two flexible sections. Each section is attached to the head actuator and to stationary posts of the disk drive housing thereby balancing the forces applied to the actuator when it is moved for head accessing. A clamp for holding the disk to the motor hub is designed to minimize distortion and to prevent shifting and misalignment of the disk relative to the center of the motor hub.

13 Claims, 3 Drawing Sheets

ASSEMBLY OF COMPACT DISK DRIVE HAVING A GLASS DISK WITH A MAGNESIUM HEAD ARM ASSEMBLY AND A STEEL MOTOR HUB

FIELD OF THE INVENTION

This invention relates to an assembly of a compact disk drive and in particular to a disk drive having a novel design and combination of components using specified materials.

CROSS-REFERENCE TO COPENDING APPLICATION

U.S. patent application Ser. No. 07/736,797 entitled "Compact Disk Drive Useful For Laptop Computer", filed Jul. 29, 1991 on behalf of R. F. Hoppe et al., and assigned to the same assignee, discloses a disk drive wherein a nonplanar configured cover encloses a head/disk assembly (HDA) having components of different heights. The cover conforms substantially to the different heights of the components, which enables a reduction in the overall height of the disk drive. The subject matter of the patent application is incorporated herein by reference.

DESCRIPTION OF THE PRIOR ART

With the introduction of laptop and notebook portable type computers, a major objective has been to make the disk drives used in these computers more compact and much smaller in size, particularly in thickness or height of the drive. Conventionally disk drives include a disk stack of one or more disks mounted to a spindle or a drive motor, a head arm with read/write heads for accessing data tracks on associated disk surfaces, a rotary type or linearly driven head actuator for moving the head arm radially relative to the disk surfaces, and a printed circuit board (PCB) with electronic circuitry for processing signals to implement various functions of the disk drive.

The structural members of prior art disk drives, such as the disks, motor hub and flange, are typically made of an aluminum alloy or die cast aluminum. In some implementations the hub on which the disks are mounted is made of steel to eliminate the need for separate magnetic return path members, thereby realizing a further reduction of drive motor size. However, the use of a steel hub with aluminum disks introduces the problem of thermal expansion mismatch between the two materials. This condition results in the disk being displaced relative to the center of the hub such that the data tracks recorded on a disk surface rotates in an eccentric path, whereby data retrieval becomes virtually impossible.

To solve this problem, attempts have been made to install separation material between the disk and the hub in both the radial and axial directions. Another approach to this problem is to increase the clamping force of the clamp attached to the motor hub to overcome the thermal stress induced by the thermal expansion mismatch. When an operator applies the clamping force to the clamp that holds the disks to the motor hub, the amount of deflection is determined by the operator working with a torque gage. It has been found that the clamping force, which may be 10-20 inch ounce for example, may vary from one assembly to the next due to variations in operator handling and changes in the accuracy of the torque gage. Improper clamping tends to cause warping of the clamp as well as the disks, which could result in an imbalance and misalignment and shifting of the hub and the disks. These approaches require additional parts, additional labor and extra care during the assembly process in order to be implemented and this assembly technique is not always successful.

Also, a major consideration in the design of disk drives is access time, i.e., the time that it takes for the read/write heads to move to selected data tracks. It is apparent that the mass and weight of the head arm assembly is a contributing factor in determining the access time, and that a reduction in weight of the head arm would reduce access time accordingly. In addition, it is highly desirable to fly the read/write heads as close as possible to the surfaces of the disks so that data packing density is substantially increased. To achieve the low flying height, the materials used for the operating components of the drive that contribute to determining the flying height must be selected so as to provide optimum operation of the disk drive.

In a typical prior art disk drive, a flexible cable having a number of copper traces is provided to enable electrical connection of the read/write heads to the PCB. The flexible cable has stationary portions at its ends that are secured to the outer housing and a dynamic cable portion that flexes as the head actuator rotates. When the cable flexes, a bias force is developed and transmitted to the actuator during movement of the actuator. Therefore, the magnitude and direction of the bias force must be closely controlled. In addition, the flexible cable must be designed to avoid fatigue failure of the copper traces. Furthermore, the flexible cable should not interfere mechanically with adjacent parts during movement of the cable.

SUMMARY OF THE INVENTION

An object of this invention is to provide a compact disk drive of reduced size and weight for use in a laptop or notebook computer.

Another object of this invention is to provide a compact disk drive that minimizes thermal expansion mismatch of the HDA components.

Another object is to provide a compact disk drive having improved access time.

A further object is to provide a compact disk drive incorporating a flexible circuit cable that functions with reduced stress and fatigue.

In a preferred embodiment of this invention, a compact disk drive incorporates at least one glass disk, a plurality of thin film read/write head assemblies associated with said disk in transducing relation and a magnesium head arm assembly. The magnet housing for the actuator, which preferably is a voice coil motor (VCM), is made from an integral steel unit. The thermal coefficient of expansion of the glass material is closely matched to the steel components, particularly to the steel motor hub and hub flange to which the glass disk is mounted. Also, the flexible cable, which attaches to the magnetic heads and to external circuitry, is divided into two sections, whereby balanced opposing forces are developed during rotary movement of the head arm actuator so that the bias force on the actuator is minimized. In addition, the VCM magnet housing is made from a unitary part to minimize the cost of material and labor. By virtue of the novel combination of disk drive components formed of specified materials and the design of the drive assembly and its parts, the problems set forth above are effectively eliminated and the size of the disk drive is reduced.

BRIEF DESCRIPTION OF THE DRAWINGS

The invention will be described in greater detail with reference to the drawings in which.

Similar reference numerals refer to similar elements throughout the drawing. For the purpose of convenience, the Figures are not drawn to scale and the sizes of the various parts may vary from figure to figure of the drawings.

DESCRIPTION OF THE PREFERRED EMBODIMENT

Figure 1:
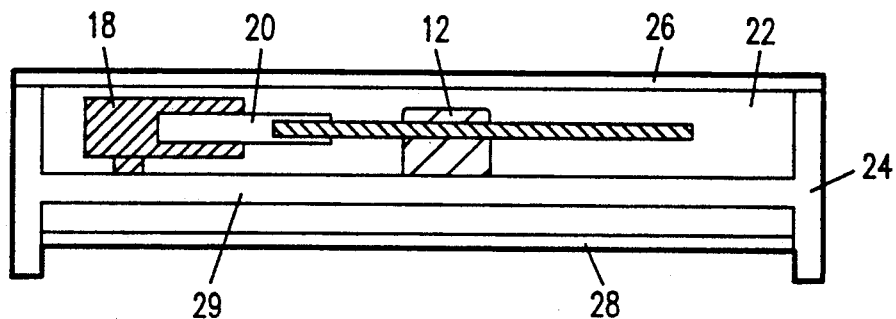
FIG. 1 is a schematic side view of a prior art compact disk drive, illustrating the basic components of a typical drive.
Figure 2:
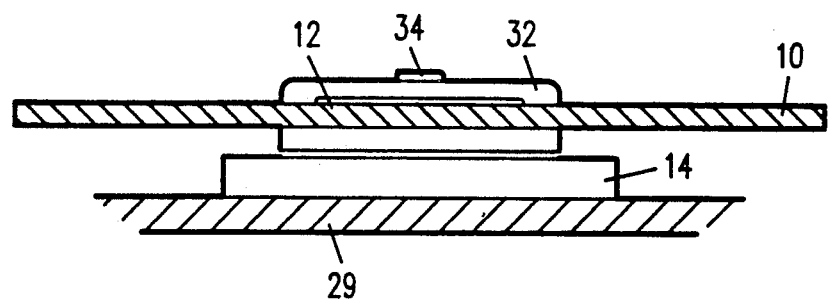
FIG. 2 is an enlarged schematic side view of a portion of the disk drive, partly broken away, showing the clamping mechanism for mounting a disk to a motor hub.
Figure 3:
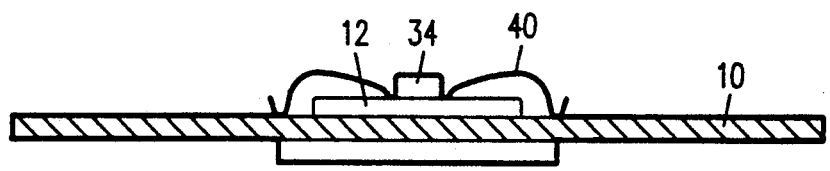
FIG. 3 is a representational view of a clamp in a deformed condition, showing the screw used for fastening the clamp to the motor hub.
Figure 5:
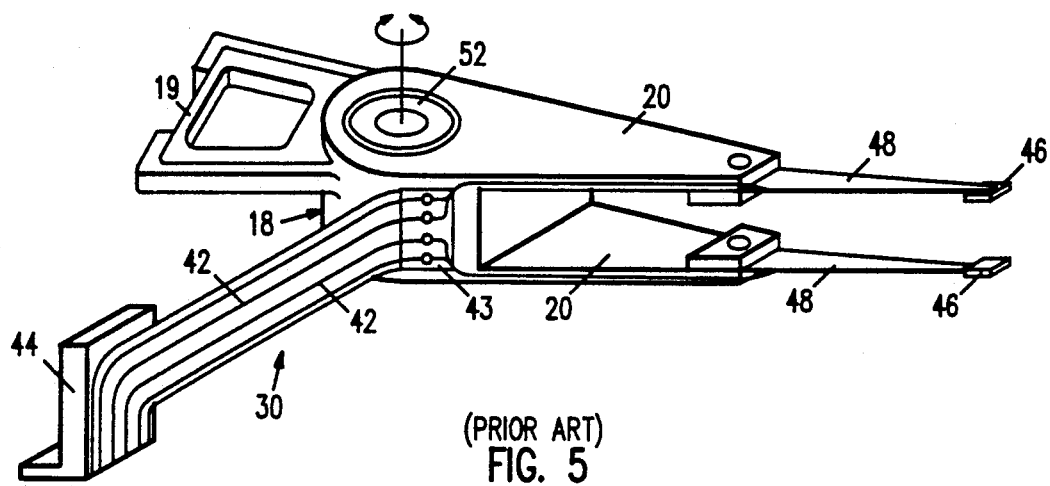
FIG. 5 is an isometric representational view of a flexible circuit cable attached to the head arm in a typical prior art assembly.

A typical prior art disk drive and its basic components are depicted in FIGS. 1 and 2. A disk stack 10 of one or more aluminum disks is seated to a rotatable motor hub 12 and stationary flange 14 which are attached to a spindle or drive motor that is rotatable at a predetermined speed. More than one disk may be mounted in the stack to provide added storage capacity provided space is available in the disk drive to accommodate the increased height of the stack. The prior art motor hub 12 and the stationary flange 14 are made of aluminum alloy or die cast aluminum A rotary actuator 18, preferably a voice coil motor, is used to move a head arm assembly 20 radially relative to the storage disk surfaces. A bearing cartridge 52 is installed in the actuator 18 to permit rotation of the actuator. As shown in FIG. 5, the head arm assembly includes a head arm 20 with spring-loaded flexures or suspensions 48 that support head sliders having thin film transducers deposited thereon which constitute the read/write heads 46. During the read and write modes, the thin film read/write heads 46 are moved to selected ones of concentric data tracks registered on the disk surfaces for transducing data signals.

The HDA is enclosed in an air sealed compartment 22 formed by base housing 24 and a cover housing 26 to prevent the entry of contaminants and deleterious particles which would adversely affect operation of the disk drive. Adjacent and external to the compartment 22, a PCB 28 is located between the side walls of the base housing 24 and below a bottom closure 29 of the housing 24. The PCB 28 has electrical components which are coupled to a flexible circuit cable 30 (shown in FIG. 5) to process and transfer data signals between external circuitry and the read/write heads 46 and to provide control and address signals to the VCM for moving the head arm actuator 18.

The enlarged section of FIG. 2 illustrates the assembly of the disk 10 to the motor hub 12 and the flange 14 by means of a clamp 32 and fastening screw 34. The disk 10 is securely held between the lip of the hub 12 and the clamp 32. To eliminate the need for a separate magnetic return path which requires additional magnetic pieces, steel material is preferably used for the disk motor hub and flange. This allows a further reduction in the size of the disk drive assembly but creates a problem of thermal expansion mismatch.

In accordance with this invention, a disk made of a hard glass substrate with a thin film of magnetic coating on each recording surface is used to enable low flying height and to afford durability and longer life than the conventional aluminum disks. The glass material has a coefficient of thermal expansion closely matched to the steel material used for the motor hub and flange. The thickness of the glass disk is about 0.90 millimeters and the thermal coefficient of expansion of the glass is in the range of approximately $3.3-6.0 \times 10^{-6}/°F$. The motor hub and flange are made of a stainless steel material designated as the 400 series which has a thermal coefficient of expansion in the range of about $5.5-9.0 \times 10^{-6}/°F$. as compared to that of aluminum which has a thermal coefficient is $11.1-13.4 \times 10^{-6}/°F$. It is apparent that the use of aluminum disks with a steel motor hub and steel flange presents a severe problem of mismatch of the thermal expansion coefficients. By using the glass disk in combination with the steel hub and steel flange, problems of misalignment, shifting and eccentricity of the disk tracks are alleviated.

Another feature of the inventive combination is the use of magnesium for the head arm 20. The lightweight magnesium material affords a significant reduction in weight thereby enabling more rapid accessing of the heads to selected data tracks. The use of magnesium material allows a reduction in weight of the head arm assembly of about 30 percent.

Figure 4:
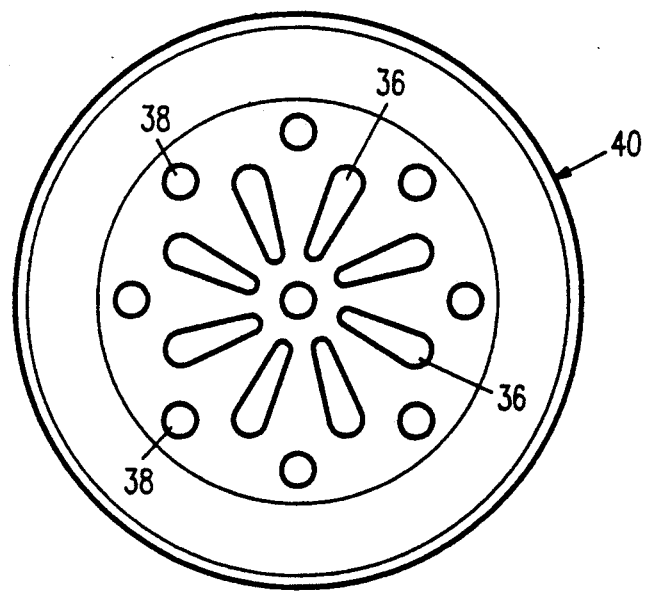
FIG. 4 is a top plan view of a clamp with the novel design used in this invention to provide a desired spring constant and to control the clamping force.

The disk drive assembly disclosed herein preferably uses a steel clamp 40 having a novel design, shown in enlarged detail in FIG. 4. The steel material of the clamp 40 is thermally compatible with the steel material of the steel hub 12. However the steel material of the clamp is much stiffer than aluminum. Therefore, the clamp 40 is formed with teardrop shaped apertures 36 arranged in a symmetrical circular pattern around the center of the clamp. A circular array of holes 38 encompasses the apertures 36. The pattern of apertures 36 and holes 38 minimizes any undesirable disk distortion. During assembly of the disk drive, the clamping screw 34 is tightened down to the point where the deformed portion of the clamp 40 comes into contact with the motor hub 12. The clamping force of clamp 40 is a function of the clamp geometry and spring constant of the material and is independent of the screw tightening torque. Therefore variations in force applied to the clamp during assembly arising from process variations are eliminated. Only a single fastening screw 34 is needed and the time-consuming step of torque clamping is no longer required.

FIG. 5 illustrates a typical prior art assembly of a flexible cable 30 connected to a rotary actuator 18 in a disk drive. The cable 30 is formed with a number of copper traces 42 disposed in parallel and insulated from each other. The cable 30 has adhesive backing that enables attachment of one end of the cable 30 to a stationary part 44 of the disk drive housing. The cable 30 includes cable pins at that end which are tied to the conducting traces 42. The pins are engaged with a socket for electrical connection to external circuitry, as is well known. The other end of the cable is connected to solder pads 43 to which the read/write head circuits are connected. Thus electrical connection is made between the heads 46 through the copper traces 42 to the PCB 28.

In the prior art assembly of FIG. 5, the flexible cable 30 consists of a stationary portion that is attached to the stationary part 44 of the disk drive housing and a dynamic portion which flexes when the head arm actuator 18 rotates during operation of the disk drive. The flexing of the cable 30 creates a bias force which is transmitted to the actuator 18 during rotation of the actuator and resultant movement of the cable 30.. It is necessary to control and minimize the magnitude and direction of the bias force so that actuator operation is not adversely affected.

Figure 6:
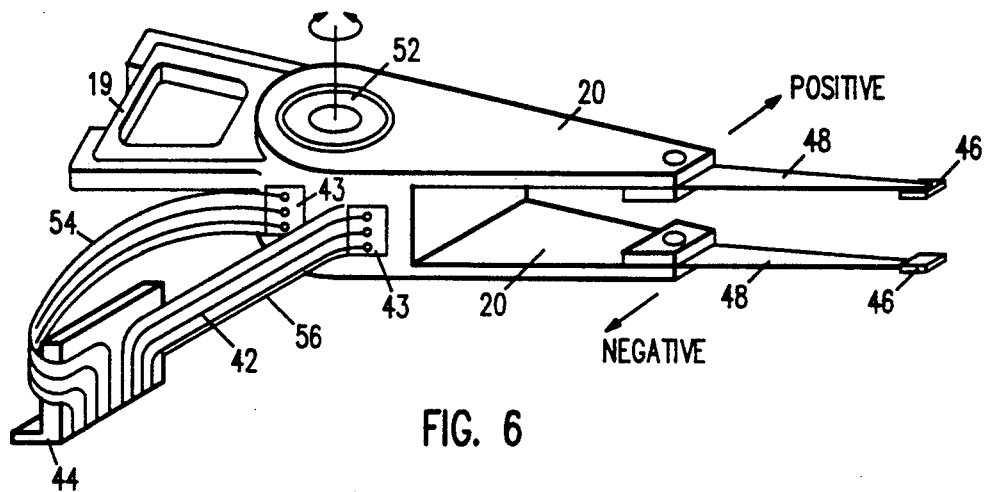
FIG. 6 is an isometric representational view of a novel flexible cable assembly, made in accordance with this invention.

According to a feature of this invention, a flexible cable assembly is formed with two independent shortened flexing sections 54 and 56, shown in FIG. 6. During operation of the head actuator 18, flex section 54 exerts a bias force on the actuator in the positive direction depicted by the arrow, and flex section 56 exerts a bias force in the opposite or negative direction. The flex sections 54 and 56 are so located and routed that the bias forces applied to the actuator negate each other, thereby minimizing the magnitude of the overall bias force. The ends of the dynamic portions of the flexible cable sections 54 and 56 are oriented and located so that no mechanical interference occurs between the two flexible sections or with the rotary actuator mechanism. Also as there are two dynamic portions, instead of one as implemented in the prior art, twice the number of traces can be provided using the same width of flexible cable, thereby affording twice the number of signal paths. In an implementation of the invention, the flexing portions of cable sections 54 and 56 are approximately 1.217 inches and 1.583 inches long respectively.

Figure 7:
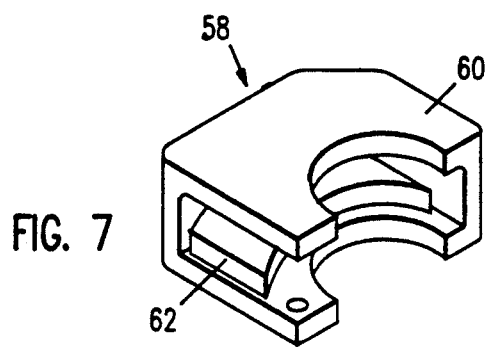
FIG. 7 is an isometric representation of a magnet housing used with the magnet of the voice coil motor head actuator with the present invention.

Another feature of the invention is the use of a single piece 58 of magnetic steel (shown in FIG. 7), which is machined to provide a unitary housing 60 for the magnet 62 incorporated in the voice coil motor 18 for coaction with the electrically conducting voice coil 19. The integral piece 58 can be made from die cast steel in one casting thereby realizing a savings in cost and having improved structural characteristics.

By virtue of the invention disclosed herein, a compact disk drive significantly reduced in size in weight can be made. The problem of thermal expansion mismatch is solved by the selection of materials that have closely matched thermal coefficients. Access time is improved by using a lightweight material, such as magnesium, for the head arm structure. The flexible cable assembly minimizes stress and fatigue of its copper traces and does not encounter any mechanical interference during movement of the actuator. In one implementation, a compact disk drive has dimensions of about 87.6 mm in length, 69.8 mm in width and a height of about 12 mm.

It should be understood that the invention is not limited to the specific parameters, dimensions or materials set forth above but that modifications may be made within the scope of the invention.

What is claimed is:

1. A compact disk drive for use with a laptop computer, said drive having a housing with stationary parts comprising:
   at least one magnetic storage disk formed with a glass substrate and thin magnetic film deposited on said substrate for storing data signals on the disk surfaces;
   a head arm assembly including a plurality of read/write thin film heads for transducing read/write signals registered on data tracks of said disk surfaces; wherein said head arm assembly is formed from a magnesium material;
   a head arm actuator coupled to said head arm assembly for moving said read/write heads to access said data tracks;
   a drive motor hub to which said disk is mounted and a hub flange formed with said motor hub, wherein said hub and flange are made of a steel material;
   a steel clamp for clamping said disk to said motor hub; wherein said glass material and said steel material are characterized by closely matched coefficients of expansion.

2. A compact disk drive as in claim 1, wherein said clamp is formed with a plurality of apertures for providing stiffness and for minimizing distortion of said clamp.

3. A compact disk drive as in claim 2, wherein said apertures are formed in teardrop type shapes and are disposed in a circular array about the center of said clamp.

4. A compact disk drive as in claim 1, including a flexible cable assembly coupled to said actuator and to a stationary part of said disk drive housing, said cable assembly being formed with two separate independent sections.

5. A compact disk drive as in claim 4, wherein said flexible cable sections each comprise at least eight copper traces for connection to said read/write heads and to circuitry external to said disk drive.

6. A compact disk drive as in claim 1, wherein said actuator is a rotary voice coil motor.

7. A compact disk drive as in claim 1, wherein said actuator comprises an integral magnet housing made from a single piece of steel.

8. A compact disk drive as in claim 4, wherein said drive dimensions are no greater than 87.6 millimeters in length, 69.8 millimeters in width and about 12–15 millimeters in height.

9. A compact disk drive for use with a laptop computer comprising:
   at least one magnetic storage disk;
   a drive motor assembly to which said disk is seated for rotation, said assembly including a rotatable motor hub and flange, said hub and flange being made from steel material;
   a clamp for securing said disk to said hub, said clamp being made of steel material;
   a head arm assembly including thin film heads for accessing concentric data tracks registered on said disk, said head arm being formed substantially from magnesium material;
   an actuator for moving said head arm assembly to selected data tracks for transducing data signals, wherein said clamp is formed with apertures, and the clamping force of said clamp is dependent on the design and the spring constant of the material of said clamp.

10. A compact disk drive as in claim 9,, including a single screw for fastening said clamp to said motor hub.

11. A compact disk drive as in claim 9, including a flexible cable assembly connected to said actuator, said assembly being formed from a plurality of independent separate sections.

12. A compact disk drive as in claim 9, wherein said disk includes a substrate made of glass material.

13. A compact disk drive as in claim 11, wherein the height of said drive is about 12 millimeters.

* * * * *